(12) United States Patent  
Ananthanarayanan et al.

(10) Patent No.: US 9,337,539 B1
(45) Date of Patent: May 10, 2016

(54) COMBINED ANTENNA ELEMENT WITH MULTIPLE MATCHED FEEDS FOR MULTIPLE COMPONENT CARRIER AGGREGATION

(71) Applicant: Amazon Technologies, Inc., Seattle, WA (US)

(72) Inventors: Peruvemba Ranganathan Sai Ananthanarayanan, Sunnyvale, CA (US); In Chul Hyun, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/562,605

(22) Filed: Dec. 5, 2014

(51) Int. Cl.
*H01Q 21/30* (2006.01)
*H01Q 5/335* (2015.01)
*H01Q 21/00* (2006.01)
*H04B 1/40* (2015.01)

(52) U.S. Cl.
CPC ........... *H01Q 5/335* (2015.01); *H01Q 21/0006* (2013.01); *H01Q 21/30* (2013.01); *H04B 1/40* (2013.01)

(58) Field of Classification Search
CPC ................................. H01Q 21/30; H04B 1/40
See application file for complete search history.

(56) References Cited

U.S. PATENT DOCUMENTS

| 7,761,061 B2 * | 7/2010 | Rofougaran et al. ........... 455/80 |
| 8,543,176 B1 * | 9/2013 | Daniel et al. ................ 455/575.7 |
| 2008/0084345 A1 * | 4/2008 | Rougas et al. ................... 342/14 |
| 2011/0149886 A1 * | 6/2011 | Xu et al. ....................... 370/329 |

* cited by examiner

*Primary Examiner* — David Bilodeau
(74) *Attorney, Agent, or Firm* — Lowenstein Sandler LLP

(57) ABSTRACT

Antenna structures and methods of operating the same of an electronic device are described. One apparatus includes an antenna element and three matching circuits coupled to the antenna element. The first RF module is operable to cause the antenna element to radiate or receive electromagnetic energy in a first frequency range. The second RF module is operable to cause the antenna element to radiate or receive electromagnetic energy in a second frequency range and a third frequency range. The impedance matching circuits are operable to match an impedance of the antenna element to an impedance of the first RF module to radiate or receive in the first frequency ranges and to match impedances of the antenna element to impedances of the second RF module to radiate or receive the electromagnetic energy in the second and third frequency ranges.

20 Claims, 12 Drawing Sheets

COMBINED ANTENNA ELEMENT WITH MULTIPLE MATCHED FEEDS FOR MULTIPLE COMPONENT CARRIER AGGREGATION

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF THE DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
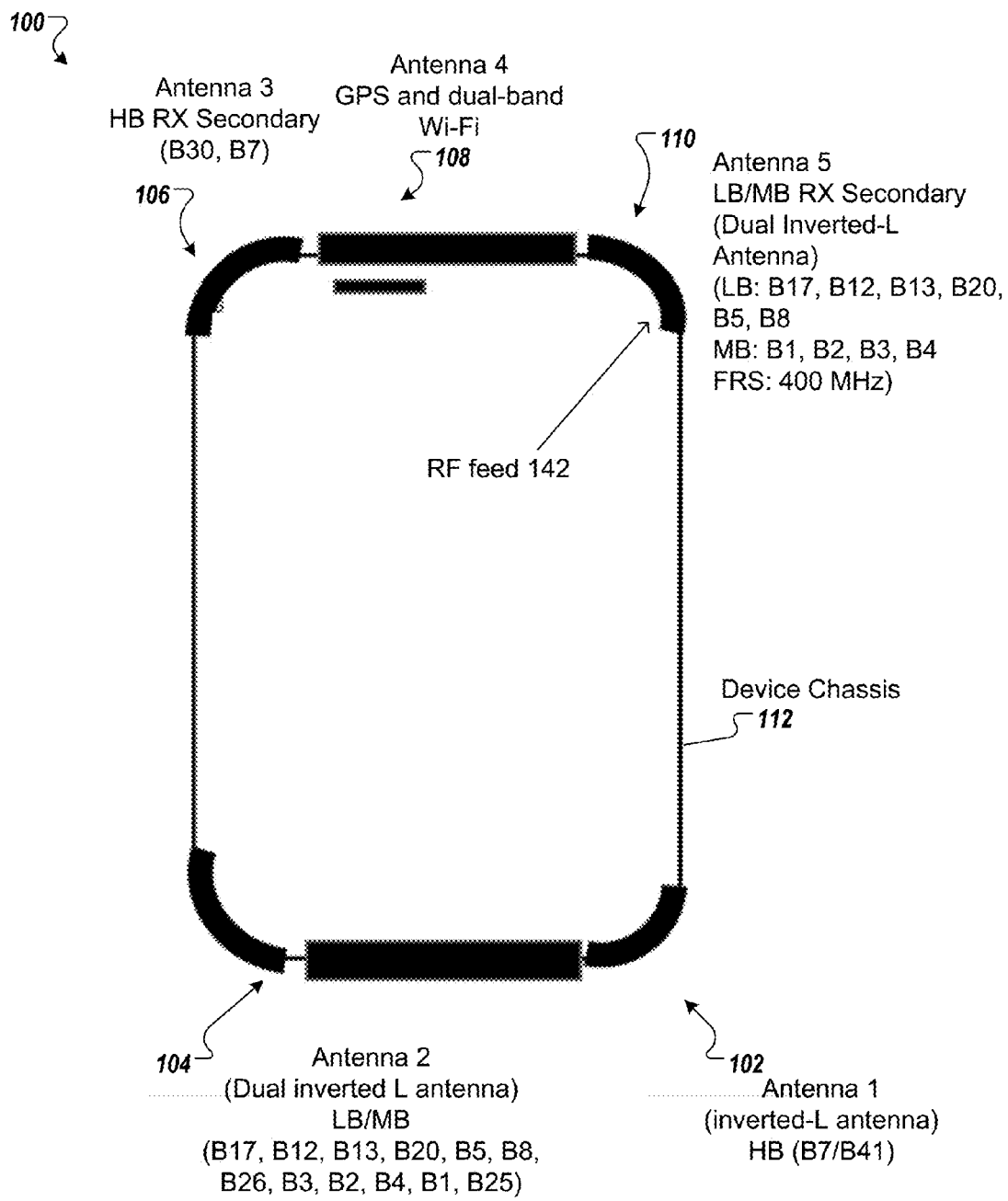
FIG. 1 is a rear view of a user device with five antenna structures according to one embodiment.

Antenna structures with a combined antenna element with multiple matched feeds for multiple component carrier aggregation, and methods of operating the same, of an electronic device are described. One apparatus includes an antenna element and three matching circuits coupled to the antenna element. The first RF module is operable to cause the antenna element to radiate or receive electromagnetic energy in a first frequency range. The second RF module is operable to cause the antenna element to radiate or receive electromagnetic energy in a second frequency range and a third frequency range. The impedance matching circuits are operable to match an impedance of the antenna element to an impedance of the first RF module to radiate or receive in the first frequency ranges and to match impedances of the antenna element to impedances of the second RF module to radiate or receive the electromagnetic energy in the second and third frequency ranges.

In a constrained radiation space (low and thin profiles for mobile devices) of user devices, antenna engineers face various challenges. As the antenna volume in devices is reduced, there is a need to design more antenna elements and to use reconfigurable antennas. Also, the need to include Family Radio Services (FRS) capability, another larger antenna element is needed. Also, there are reasons for concurrent communication in FRS spectrum and other wireless area network (WAN) frequency bands. For example, the antenna element receives electromagnetic energy in a FRS frequency band concurrently while receiving electromagnetic energy in one or more WAN frequency bands. The embodiments described herein include a simplified non-reconfigurable antenna system architecture which extends to the FRS frequency range (400 MHz) and supports simultaneous or concurrent communications in different frequency bands with good isolation between the frequency bands. The antenna architecture may be considered non-reconfigurable in that an antenna element can be sized for FRS spectrum, and does not include any switches or diodes to actively reconfigure the antenna element to operate in WAN frequency bands. Rather, the antenna element, which is sized for the FRS spectrum, can be coupled to separate impedance matching networks coupled to the same feeding point. The impedance matching networks can match the impedance of the antenna element to impedances needed for the different frequency ranges, as described in more detail below.

The antenna structures described herein can be used for Long Term Evolution (LTE) frequency bands, third generation (3G) frequency bands, Wi-Fi® and Bluetooth® frequency bands or other wireless local area network (WLAN) frequency bands, wide area network (WAN) frequency bands, global navigation satellite system (GNSS) frequency bands (e.g., positioning system (GPS) frequency bands, or the like.

The electronic device (also referred to herein as user device) may be any content rendering device that includes a modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, DVD players, media centers, and the like. The user device may connect to a network to obtain content from a server computing system (e.g., an item providing system) or to perform other activities. The user device may connect to one or more different types of cellular networks.

FIG. 1 is a rear view of a user device 100 with five antenna structures according to one embodiment. FIG. 1 provides an overview of a user device with an antenna system design that supports various air interface technologies, including WAN, wireless local area network (WLAN), personal area network (PAN), and Global Navigation Satellite System (GNSS) technologies in a single user device design for different global markets. The WAN technologies supported may include 4G data over Long Term Evolution (LTE) with carrier aggregation of 3G data and voice, as well as 2G. The antenna system can be categorized into two broad categories: WAN antennas and Auxiliary antennas. The WAN main and diversity antennas are used to cover multiple 4G and 3G bands.

The user device 100 (also referred to herein as an electronic device) may be any content rendering device that includes a modem for connecting the user device to a network. Examples of such user devices include electronic book readers, portable digital assistants, mobile phones, laptop computers, portable media players, tablet computers, cameras, video cameras, netbooks, notebooks, desktop computers, gaming consoles, DVD players, media centers, and the like. The user device may connect to a network to obtain content from a server computing system (e.g., an item providing system) or to perform other activities. The user device may connect to one or more different types of cellular networks.

The antenna system includes: Main WAN antenna (antenna 1 102 and antenna 2 104), Secondary WAN antenna (diversity antenna) (antenna 3 106 and antenna 5 110), WLAN/PAN and GPS/GNSS antenna (antenna 4 108). In particular, the user device 100 includes a first antenna 102 (Primary high-band Antenna 1 for transmit (TX) and receive (RX)), a second antenna 104 (Primary Antenna 2 for TX/RX), a third antenna 106 (Antenna 3, Secondary High-band RX/GPS antenna for MIMO and Diversity), a fourth antenna 108 (Antenna 4 WLAN/PAN antenna) (e.g., 2.4 GHz & 5 GHz dual-band Wi-Fi® bands & Bluetooth® band and GPS/GNSS bands) and a fifth antenna 110 (Secondary low-band RX Antenna 5 for MIMO and Diversity). In another embodiment, the user device 100 includes a sixth near field communication (NFC) antenna (not illustrated in FIG. 1) located at a rear side of the user device, such as under a plastic insert within an opening in a device chassis 112. The user device 100 may also include a RFID tag (not illustrated). In other embodiments, other types of antennas may be used, such as monopole antennas, loop antennas, patch antennas, inverted F antennas, planar inverted F antennas, and so forth. It should be noted that the user device 100 may include a back cover of various types of materials. For example, the back cover may be all metal with a separate from the top (e.g., 2 mm separation). The back cover may also be plastic, leather, or other non-conductive materials. Although not illustrated in FIG. 1, when the back cover is metal, the back cover can cover the user device up to a bottom portion where the antennas 102, 104 are located and up to a top portion where the antennas 106, 108, 110 are located. In other embodiments, the rear cover may cover the entire back side of the user device when other non-conductive materials are used. In other embodiments, other housing structures (e.g., rear housing) may be used to accommodate the antennas 102, 104, 106, 108, and 110 as described herein.

The first antenna 102 may be referred to as a high-band WAN primary antenna and the second antenna 104 may be referred to as a low-band WAN primary antenna. In another embodiment, the second antenna 104 can be a primary low-band (LB) antenna, a primary LB/Mid-Band (MB) antenna, a primary MB/high-band (HB) antenna or a primary LB/HB antenna. The third antenna 106 may be referred to as an high-band WAN secondary RX, the fourth antenna 108 may be referred to as a wireless local area network (WLAN) and GPS antenna (or separate antennas for WLAN and GPS), and the fifth antenna 110 may be referred to as a low-band/mid-band WAN secondary antenna. A diversity antenna is a secondary antenna that may be used along with the one or more primary antennas to improve the quality and reliability of a wireless link. There may be no clear line-of-sight between a transmitter and a receiver. Instead, a signal may undergo multiple reflections between transmission and reception. Each reflection may introduce time delays, phase shifts, distortions, attenuations, etc. that can degrade a signal quality. The diversity antennas have a different location and/or configuration than the primary antennas on the user device, and may therefore experience different phase shifts, time delays, attenuations, distortions, etc. Accordingly, signals at the diversity antenna can be compared to signals at the primary antenna to determine and mitigate such effects. The primary LB antenna and diversity LB antenna may have a length and configuration that are optimized for transmission and receipt of radio frequency (RF) signals in the range of about 650 Megahertz (MHz) to about 1000 MHz. A primary mid-band (MB) antenna and diversity MB antenna have a length and configuration that are optimized for transmission and receipt of RF signals in the range of about 1700 MHz to about 2200 MHz. A primary high-band (HB) antenna and diversity HB antenna have a length and configuration that are optimized for transmission and receipt of RF signals in the range of about 2300 MHz to about 2700 MHz. As described in the embodiments, the HB can be split into multiple frequency bands in different configuration. The user device 100 may include other antennas, such as a personal area network (PAN)/WLAN antenna having a length and size optimized for 2.4 GHz RF signals and 5 GHz RF signals (e.g., for Bluetooth®, dual-band Wi-Fi® networks, or the like). The user device 100 may include other antennas, such as GPS antenna having a length and size optimized for RF signals in the range of about 1400 MHz to about 1600 MHz. Numerous other antenna selections may be used in various user devices. For example, a user device may have fewer primary antennas and/or fewer diversity antennas as depicted in FIG. 1.

For purposes of description, when antenna locations are discussed, it is with respect to looking at the user device 100 from a back side (an opposite side of a display on a front side) with a top edge of the user device 100 pointing upwards to the sky. The primary TX/RX antenna elements (e.g., first antenna 102 and second antenna 104), also sometimes referred to as the main antenna, is located at a bottom side of the user device 100, while the secondary RX antenna elements (e.g., third antenna 106 and fifth antenna 110) are located at a top side of the user device 100. The fifth antenna 110 may be considered a combined FRS-WAN antenna as described below with respect to FIGS. 2-13.

The primary or main antenna is made up of two elements, a high-band element 102 (Antenna 1) located at a first corner of the bottom side, and a low-band element 104 (Antenna 2) located at a second corner of the bottom side. The primary antenna may be split into two separate antenna elements with separate RF feeds to facilitate impedance matching for the two antenna elements. Splitting the primary antenna into two separate elements with separate RF feeds allows a better match to be obtained since the impedance matching circuit only has to operate at a single band (low or high). The first antenna 102 can operate at high-band (HB) frequencies with one impedance matching network coupled to one RF feed, and the second antenna 104 can operate at both the low-band (LB) and mid-band (MB) with another impedance matching network coupled to another RF feed. Alternatively, the second antenna 104 can operate at HB and MB, or LB and HB.

The secondary antenna is made up of two elements, a high-band element (Antenna 3 106) located at a third corner of the top side, and a low-band, mid-band element (Antenna 5 110) located at a fourth corner of the top side. The high-band element (Antenna 3 106) may operate as the secondary high-band RX antenna element. Also located at the top side tis the fourth antenna that operates as a WLAN/PAN antenna (Antenna 4 108) (e.g., Bluetooth®/Wi-Fi®/5 GHz frequency bands), a GPS antenna (or other GNSS frequency bands), or a combined WLAN/GPS antenna.

The user device 100 can cover various frequency bands using the five antennas, such as follows: frequency bands B7, B41 by Antenna 1 102; frequency bands B17, B12, B13, B20, B5, B8, B26, B3, B2, B4, B1, B25 by Antenna 2 104; frequency bands B30, B7 by Antenna 3 106; frequency bands Bluetooth®/Wi-Fi®/5 GHz frequency bands by Antenna 4 108; and frequency bands in low-band (LB) including B17, B12, B12, B13, B20, B5, B8, in mid-band (MB) including B1, B2, B3, B4, and FRS 400 MHz by Antenna 5 110.

In one embodiment, the first antenna 102 (antenna 1) is an inverted-L antenna and the second antenna 104 (antenna 2) and fifth antenna (antenna 5) 110 are dual inverted-L antennas. Alternatively, the antennas may be different types of antennas, including the fifth antenna (antenna 5) 110 being an inverted-L antenna, a folded monopole antenna, or the like. In another embodiment, the antennas described herein may be disposed on, within, or in connection with a circuit board, such as a printed circuit board (PCB).

The embodiments described below are directed antenna architectures for the antenna 5 110 that can be used to cover various WAN frequency bands and FRS simultaneously or concurrently.

Figure 2:
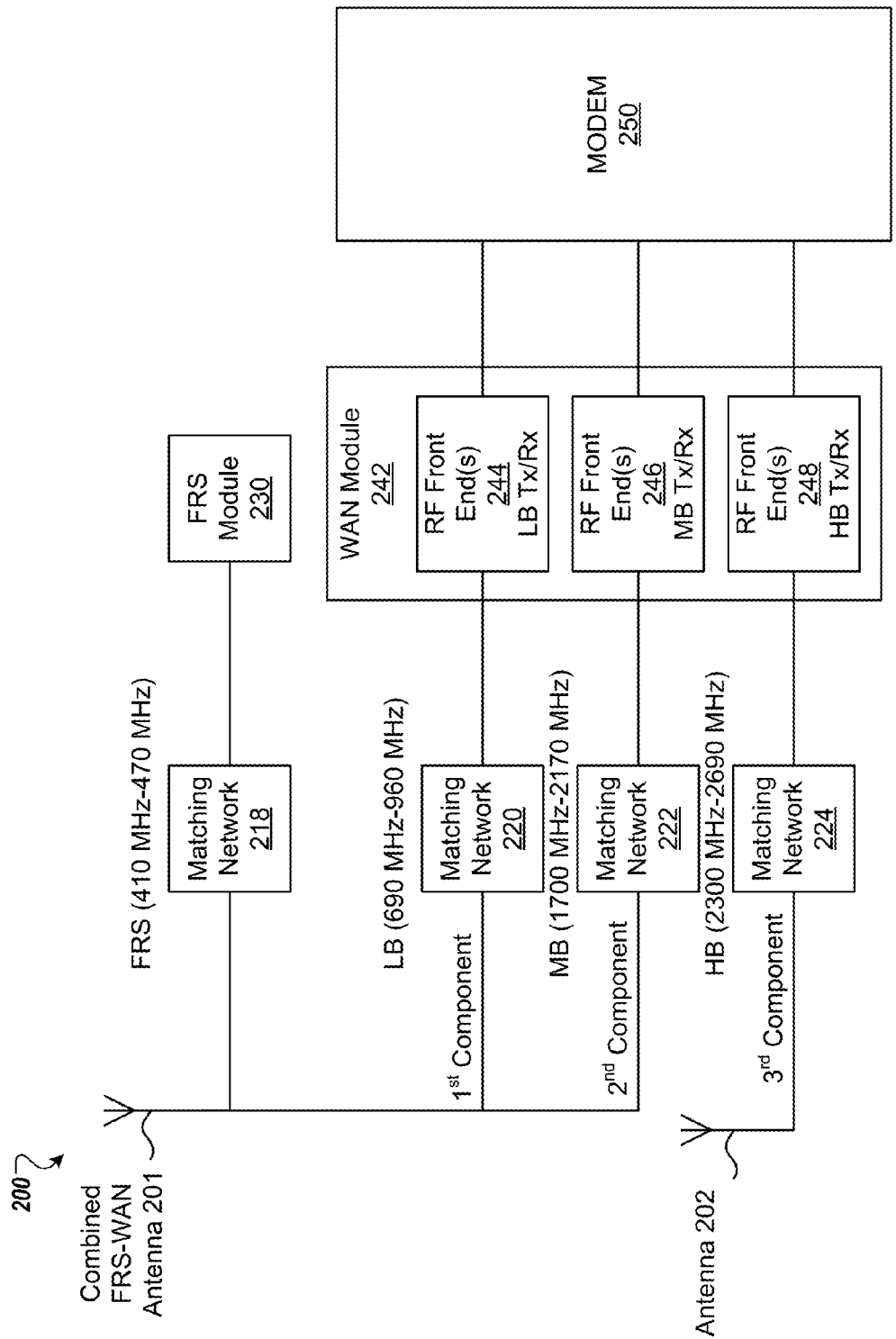
FIG. 2 is a block diagram of an antenna architecture with a combined FRS-WAN antenna and a second antenna according to one embodiment.

FIG. 2 is a block diagram of an antenna architecture 200 with a combined FRS-WAN antenna 201 and a second antenna 202 according to one embodiment. The combined FRS-WAN antenna 201 is coupled to a first impedance matching network 218, which is coupled to a FRS module 230 (first RF circuit). The FRS module 230 may be an integrated circuit disposed on a PCB of the user device 100. The combined FRS-WAN antenna 201 is also coupled to a second impedance matching network 220, which is coupled to a WAN module 242 (second RF circuit), the WAN module 242 being coupled to a modem 250.

The WAN module 242 may be a RF module for connecting to wireless base stations of a wireless carrier. The WAN module 242 may be configured to transmit and receive data using one or more WAN protocols, such as cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Long Term Evolution (LTE) and LTE Advanced (sometimes generally referred to as 4G), etc. The WAN module 242 may include one or more transmitters and/or transceivers, and may additionally include one or more primary receivers and/or secondary receivers. For example, a first transceiver may transmit and receive signals tuned to a first band (e.g., approximately 690 MHz~960 MHz in one embodiment) and a second transceiver may transmit and receive signals tuned to a second band (e.g., approximately 1700 MHz~2170 MHz in one embodiment). A WAN primary transceiver and secondary RF receiver may allow the user device to receive data using radio waves in the WAN bands via one or more antennas. In particular, the WAN secondary RF receivers may be coupled to one or more receive channels for WAN high band (HB), WAN mid band (MB) and/or WAN low band (LB). The WAN module 242 may be a separate integrated circuit than the FRS module 230.

In the depicted embodiment, the WAN module 242 and FRS module 230 include RF circuitry configured to communicate data to one or more other devices using transmissions complying with specific communication protocols. Additionally, each RF module may be configured to radiate or receive electromagnetic energy (e.g., RF signals) in different frequency bands. Some RF modules may include multiple transceivers, transmitters and/or receivers, and may support multiple-input multiple-output (MIMO) functionality. In other embodiments, the antenna architecture may include additional RF modules and/or other communication modules, such as a wireless local area network (WLAN) module, a GPS receiver, a near field communication (NFC) module, a Zigbee® module, an amplitude modulation (AM) radio receiver, a frequency modulation (FM) radio receiver, a personal area network (PAN) module (e.g., a Bluetooth® module), a Global Navigation Satellite System (GNSS) receiver, or the like.

The FRS module 230 supports FRS spectrum for the user device 100. The combined FRS-WAN antenna 201 is coupled to the first impedance matching network 218, and the first impedance matching network 218 is to match an impedance of the combined FRS-WAN antenna 201 to a first impedance of the FRS module 230 to radiate or receive electromagnetic energy in a FRS frequency band (e.g., 410 MHz to 470 MHz).

The WAN module 242 may include one or multiple RF front end circuits (RFFEs) (also referred to as RF circuitry). The RFFEs may include receivers and/or transceivers, filters, amplifiers, mixers, switches, and/or other electrical components. One example of an RF front end is described with reference to FIG. 4. In another embodiment, a GPS receiver (not illustrated in FIG. 2) can be used to receive GPS data using radio waves in the GPS band (approximately 1575 MHz) via a GPS antenna (not illustrated in FIG. 2). In this embodiment, a impedance matching network could be used to concurrently receive GPS signals from the combined FRS-WAN antenna 201 as well as other FRS signals or WAN signals as described above. Similarly, a WLAN module can be used with an impedance matching network to receive WLAN signals concurrently with other types of signals on the combined FRS-WAN antenna 201.

In one embodiment, the combined FRS-WAN antenna 201 is connected to impedance matching networks 218, 220, 222 that are on transmit/receive paths between the combined FRS-WAN antenna 201 and the respective RF circuitry (FRS module 230 and WAN module 242). A second antenna 202 may be connected to an impedance matching network 224 that is on a transmit/receive path between the second antenna 202 and the RF circuitry (WAN module 242). Alternatively, some of the impedance matching networks may be omitted for one or more of the transmit/receive paths. Impedance matching networks 218, 220, 222, 224 may be fixed impedance matching networks or may be reconfigurable impedance matching networks, as illustrated and described with respect to FIG. 5. Each antenna may be optimized or tuned for a particular frequency range or for multiple frequency ranges as described herein. In other words, an antenna may have an impedance that is matched to an impedance of the respective RF circuitry to radiate or receive electromagnetic energy in a particular frequency band. A reconfigurable impedance matching network may be reconfigured to tune the antenna to the frequency range at which it will be used. Alternatively, a fixed impedance matching network may be connected to a transmit/receive path at the input of a RF module. The fixed impedance matching network may be bypassed for connection to some antennas, and may be used for connections to other antennas. An example impedance matching network is described with reference to FIG. 3.

In the depicted embodiment, the WAN module 242 includes RF front-end circuitry (RFFE) circuitry 244 for transmission and receive (Tx/Rx) in LB, RFFE circuitry 246 for Tx/Rx in MB, and RFFE circuitry 248 for Tx/Rx in HB. The WAN module 242 supports three-component carrier aggregation. For a first component carrier, the combined FRS-WAN antenna 201 is coupled to the second impedance matching network 220, and the second impedance matching network 220 is to match an impedance of the combined FRS-WAN antenna 201 to a second impedance of the WAN module 242 to radiate or receive electromagnetic energy in a low-band (LB) frequency range (second frequency range) (e.g., 690 MHz to 960 MHz). For a second component carrier, the combined FRS-WAN antenna 201 is coupled to the third impedance matching network 222, and the third impedance matching network 222 is to match an impedance of the combined FRS-WAN antenna 201 to a third impedance of the WAN module 242 to radiate or receive electromagnetic energy in with a mid-band (MB) frequency range (third frequency range) (e.g., 1700 MHz to 2170 MHz). For a third component carrier, a second antenna 202 is coupled to a fourth impedance matching network 224, and the fourth impedance matching network 224 is to match an impedance of the second antenna 202 to a fourth impedance of the WAN module 242 to radiate or receive electromagnetic energy in a high-band (HB) frequency range (fourth frequency range) (e.g., 2300 MHz to 2690 MHz). In one embodiment, the second antenna 202 is third antenna (antenna 3) 106. Alternatively, the combined FRS-WAN antenna 201 is the second antenna (antenna 2) 104 and the second antenna 202 is the first antenna (antenna 1) 102 of FIG. 1. Alternatively, the combined FRS-WAN antenna 201 can be used by itself without the second antenna 202 or with additional antennas than the second antenna 202. The WAN module 242 and FRS module 230 permit concurrent or simultaneous communications within these frequency ranges, three of which are supported by the combined FRS-WAN antenna 201.

In another embodiment, a WLAN module may be used for WLAN communications. For example, the WLAN module may include a WLAN RF transceiver for communications on one or more Wi-Fi® bands (e.g., 2.4 GHz and 5 GHz). It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connection to the Internet wireless using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel.

The modem 250 allows the user device 100 to handle both voice and non-voice communications (such as communications for text messages, multimedia messages, media downloads, web browsing, etc.) with a wireless communication system. The modem 140 may provide network connectivity using any type of digital mobile network technology including, for example, long term evolution (LTE) technologies, cellular digital packet data (CDPD), general packet radio service (GPRS), enhanced data rates for GSM evolution (EDGE), UMTS, 1 times radio transmission technology (1×RTT), evaluation data optimized (EVDO), high-speed downlink packet access (HSDPA), WLAN (e.g., Wi-Fi® network), etc. In the depicted embodiment, the modem 250 can use the RFFE circuitry 244, 146, 148 to radiate or receive electromagnetic energy on the combined-FRS-WAN antenna 201 and the second antenna 202 to communication data to and from the user device 100 in the respective frequency ranges. In other embodiments, the modem 250 may communicate according to different communication types (e.g., WCDMA, GSM, LTE, CDMA, WiMAX, etc.) in different cellular networks.

Figure 3:
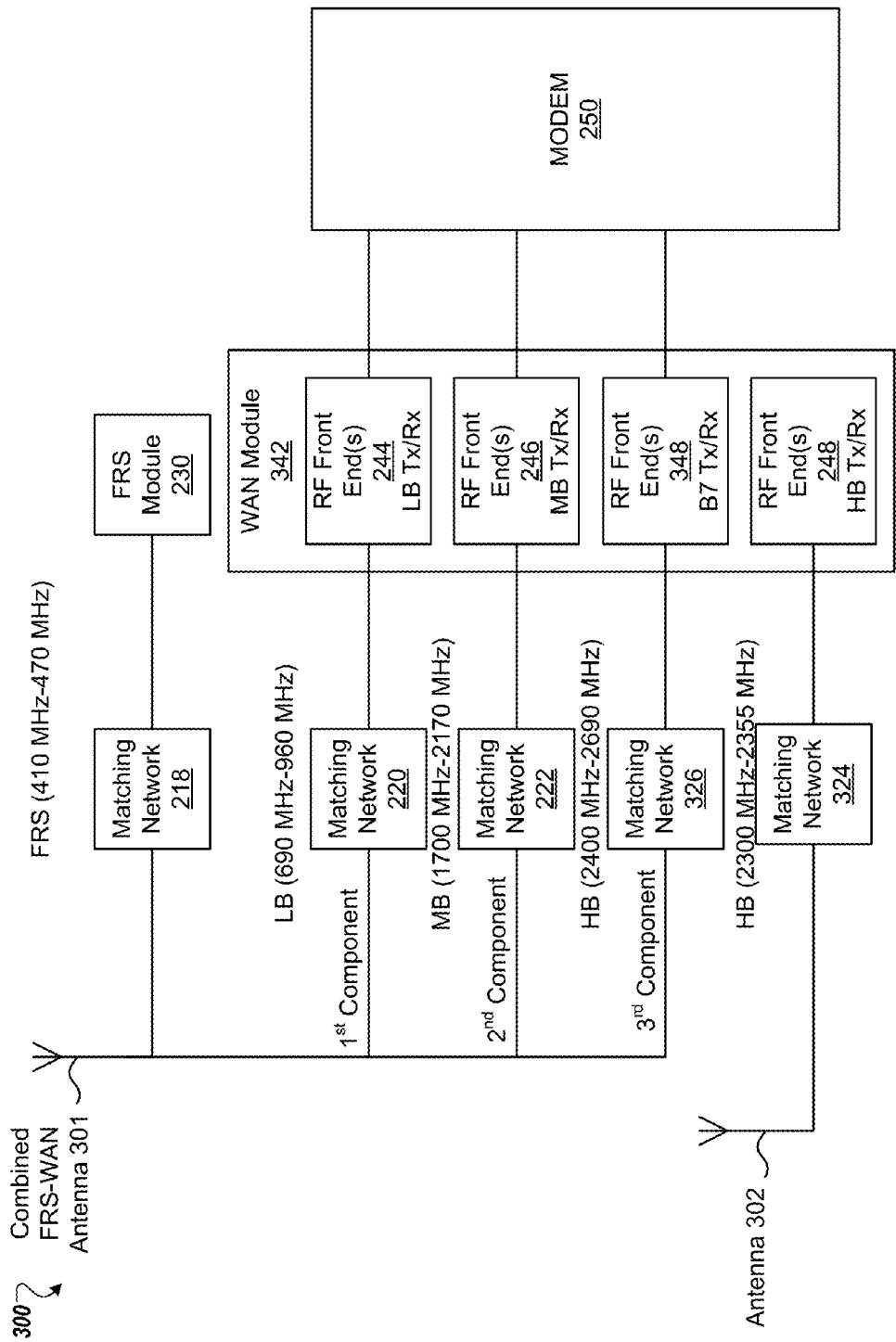
FIG. 3 is a block diagram of an antenna architecture with a combined FRS-WAN antenna and a second antenna according to another embodiment.

FIG. 3 is a block diagram of an antenna architecture 300 with a combined FRS-WAN antenna 301 and a second antenna 302 according to another embodiment. The antenna architecture 300 is similar to the antenna architecture 200 as noted by similar reference numbers. However, the combined FRS-WAN antenna 301 is coupled to the first impedance matching network 218, the second impedance matching network 220, the third impedance matching network 222 and a fifth impedance matching network 326. A second antenna 302 is coupled to a fourth impedance matching network 324, which may be similar to the impedance matching network 224 of FIG. 2. The second impedance matching network 220, third impedance matching network 222 and fifth impedance matching network 326 are coupled to a WAN module 342. The WAN module 342 is similar to the WAN module 242 in FIG. 2, except the WAN module 342 includes RFFE circuitry 244 for transmission and receive (Tx/Rx) in LB, RFFE circuitry 246 for Tx/Rx in MB, RFFE circuitry 248 for Tx/Rx in a first HB frequency range (e.g., 2300 MHz to 2355 MHz) and RFFE circuitry 348 for Tx/Rx in a second HB frequency range (e.g., 2400 MHz to 2690 MHz). The RFFE circuitry 348 is also coupled to the modem 250. In this embodiment, the WAN module 242 supports three-component carrier aggregation. The first and second component carriers are the same as in FIG. 2, but a third component carrier, the combined FRS-WAN antenna 301 is coupled to a fifth impedance matching network 326, and the fifth impedance matching network 326 is to match the impedance of the combined FRS-WAN antenna 301 to a fifth impedance of the WAN module 342 to radiate or receive electromagnetic energy in a second high-band (LB) frequency range (fifth frequency range) (e.g., 2400 MHz to 2690 MHz). For a forth component carrier, a second antenna 302 is coupled to a fourth impedance matching network 324 (similar to the fourth impedance matching network 224 of FIG. 2), and the fourth impedance matching network 324 is to match an impedance of the second antenna 302 to a fourth impedance of the WAN module 342 to radiate or receive electromagnetic energy in a first high-band (HB) frequency range (fourth frequency range) (e.g., 2300 MHz to 2355 MHz instead of 2690). The RFFE circuitry 348 and RFFE circuitry 248 can be used to split the HB range covered by the second antenna 202 of FIG. 2 into two separate HB frequency ranges. The WAN module 342 and FRS module 230 permit concurrent or simultaneous communications within these frequency ranges, four of which are supported by the combined FRS-WAN antenna 301.

Figure 4:
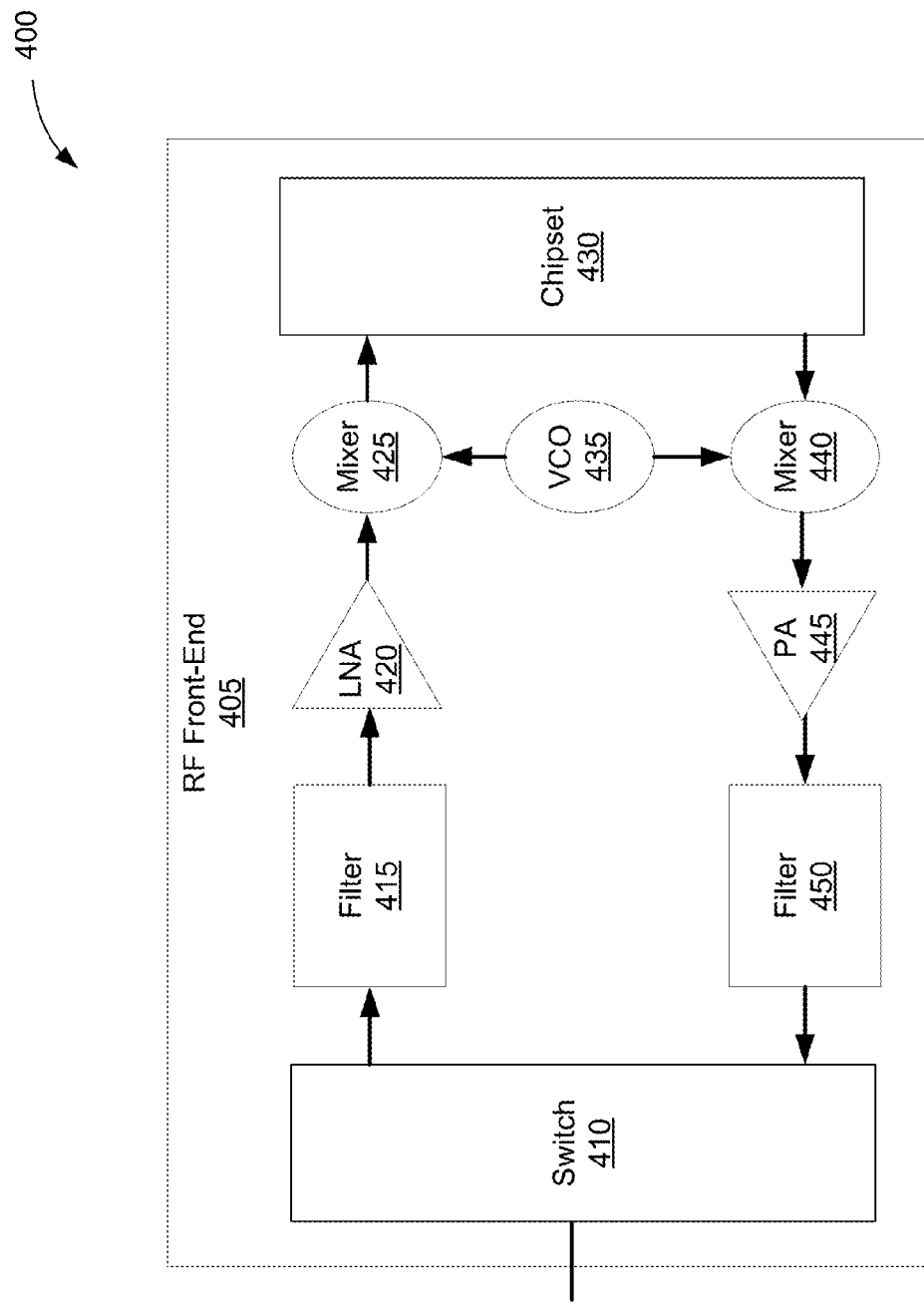
FIG. 4 is a block diagram of RF front-end circuitry for a RF module according to one embodiment.

FIG. 4 is a block diagram of RF front-end circuitry 405 for a RF module according to one embodiment. In one embodiment, the RF front-end circuitry 405 includes a switch 410 to switch between a send and a receive path. The RF front-end circuitry 405 additionally includes a filter 415 on the receive path and a filter 450 on the send path. The filters 415, 450 may be band pass filters (BPF) to pass a particular frequency range used by chipset 430. For example, if chipset 430 is a WAN transceiver, then filters 415 may be 2.0 GHZ band pass filters. Chipset 430 may be, for example, a FRS transceiver chipset, a WAN transceiver chipset, a WAN receiver chipset, a GPS receiver chipset, and so forth. After the filter 415 on the receiver path is a low noise amplifier (LNA) 420 to amplify the filtered signal. LNA 420 is followed by a mixer 425, which mixes the filtered and amplified signal with a signal from a voltage controlled oscillator (VCO) 435. The mixed signal is provided to chipset 430.

On the send path, the chipset 430 outputs a signal to mixer 440. Mixer 440 mixes the signal with a signal from VCO 435. Mixer 440 provides the mixed signal to a power amplifier (PA) 445. The power amplifier 445 amplifies the signal and provides the amplified signal to filter 450. Filter 450 then filters the signal and provides the filtered signal to switch 410 for transmission via an attached antenna.

Figure 5:
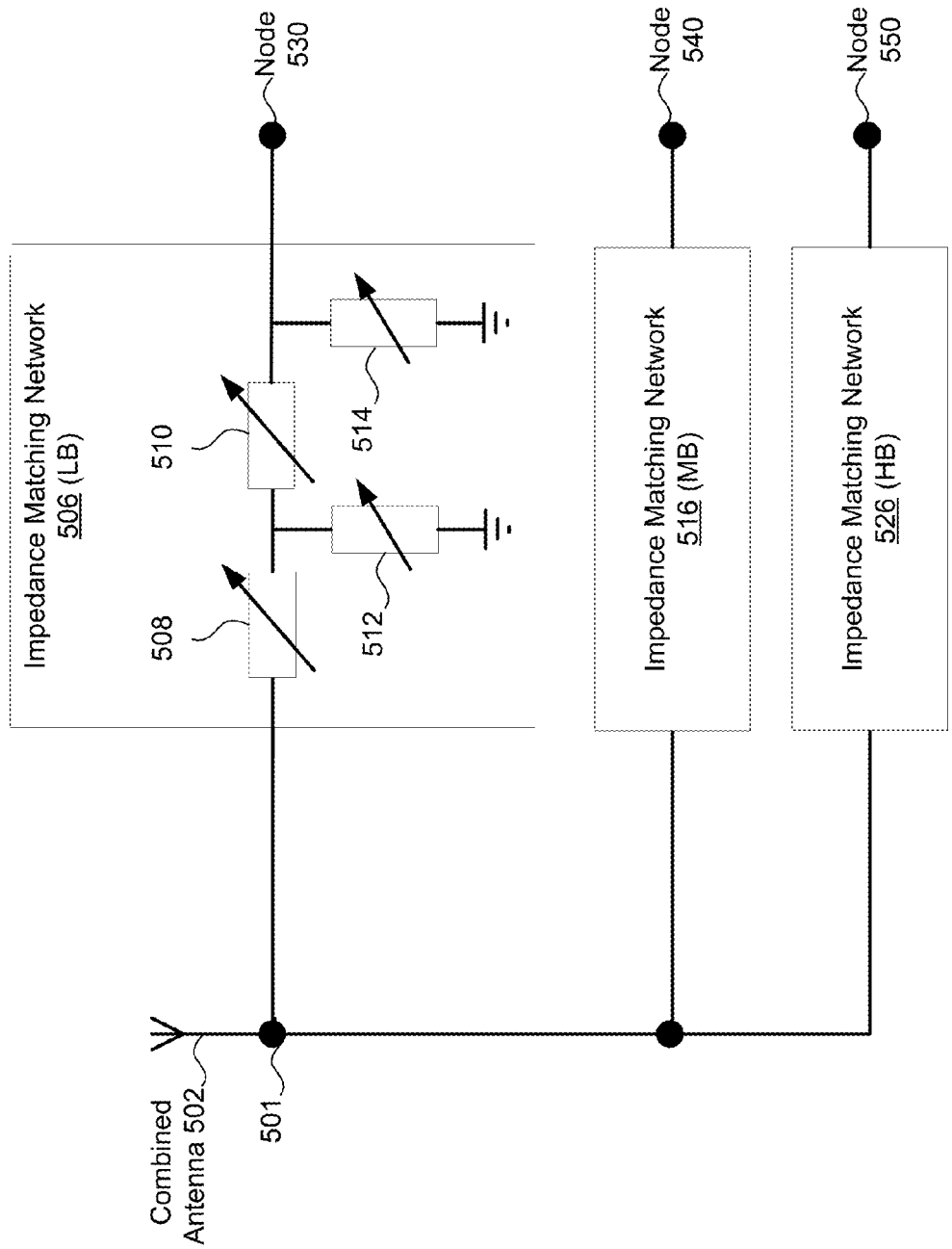
FIG. 5 is a block diagram of impedance matching networks according to one embodiment.

FIG. 5 is a block diagram of impedance matching networks 506, 516, 526 according to one embodiment. The impedance matching networks 506, 516, 526 are connected to a combined antenna 502 at feeding point 501. The combined antenna 502 may be the combined FRS-WAN antenna described herein. In one embodiment, impedance matching networks 506, 516, 526 are reconfigurable impedance matching networks, such as illustrated in impedance matching network 506. Alternatively, impedance matching networks 506, 516, 526 may be a fixed configuration impedance matching networks. For example, the impedance matching network 506 includes one or more capacitors and/or inductors 508, 510 in a path to a receiver or transceiver. These may be series capacitors or series inductors. Impedance matching network 506 additionally includes one or more inductors and/or capacitors 512, 514 that connect the electrical path to ground. These may be shunt capacitors or shunt inductors. The ground may be a connection to a metal frame of the user device. These capacitors and inductors may be variable inductors and capacitors (as shown), enabling impedance matching network 506 to be reconfigurable. Alternatively, the inductors and capacitors may have fixed values.

In some embodiments, as discussed above, the combined antenna 502 may be coupled to multiple RF modules, including a FRS module, a WAN module, or the like. In other embodiments, the combined antenna 502 may be coupled to a single RF module that includes the RF circuitry for FRS and WAN. Alternatively, other configurations are possible.

In FIG. 5, the impedance matching network 506 may be used for LB, while the impedance matching network 516 is used for MB and impedance matching network 526 is used for HB. In other embodiments, additional impedance matching networks may be used. Also, in other embodiments, other impedance matching networks can be used for bands. For example, the impedance matching network 516 can be used for matching the combined antenna 502 to a WLAN frequency or a GPS frequency. Alternatively, different combinations of frequency bands may be covered. For example, the combined antenna 502 can be coupled to multiple impedance matching networks as matched feeds for two-component or three-component carrier aggregation as described herein.

Figure 6:
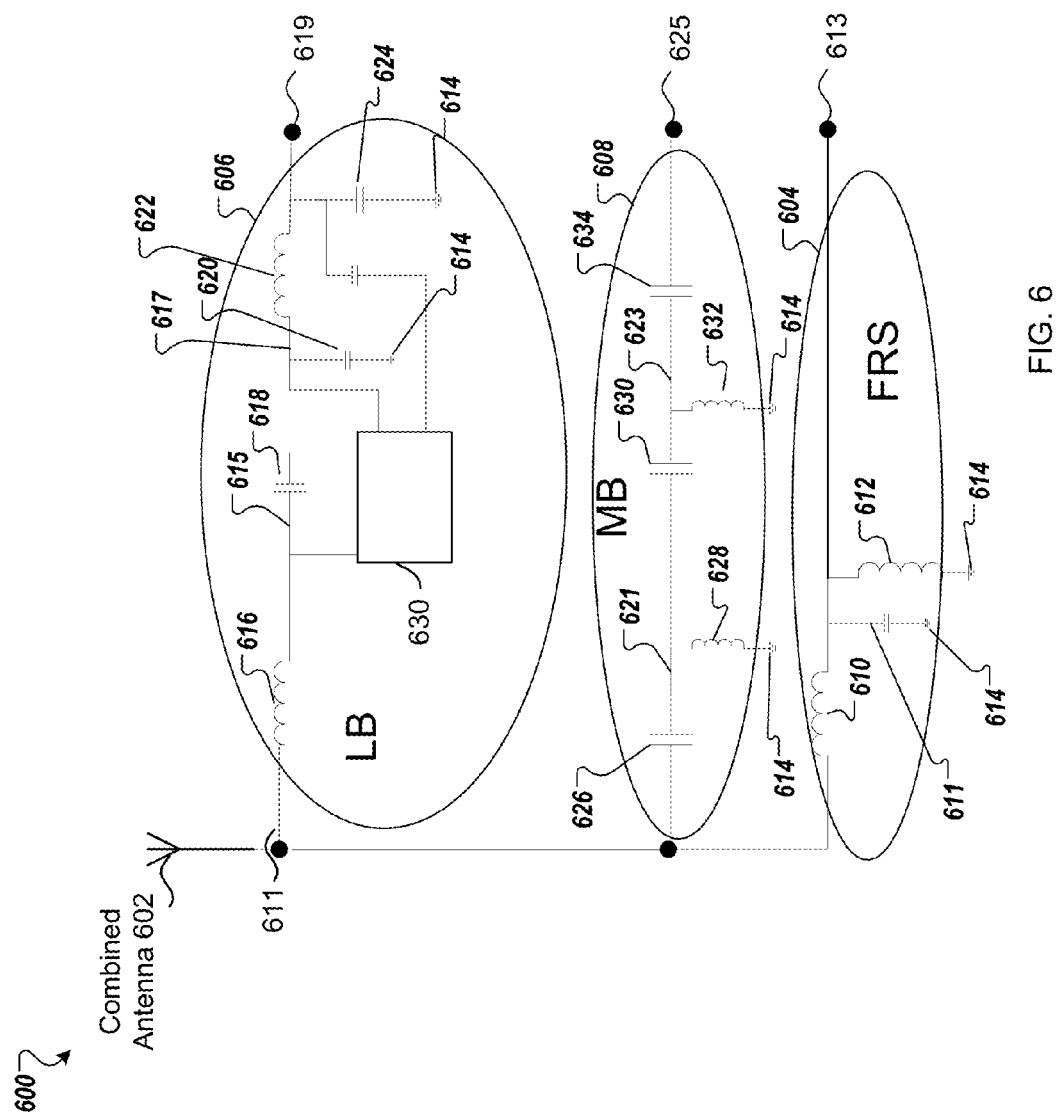
FIG. 6 is a block diagram of impedance matching networks according to another embodiment.

FIG. 6 is a block diagram of a combined antenna 602 with three impedance matching networks 604, 606, 608 according to another embodiment. The first impedance matching circuit 604 includes a first series inductor 610 and a first shunt inductor 612. The first series inductor 610 is coupled between a RF feed 611 and a first node 613, the first node 613 being coupled to a first RF circuit (e.g., FRS module 230). Node, as referred to herein, is any point on a circuit where two or more circuit elements connect. The first shunt inductor 612 is coupled between the first node 613 and ground 614. Another shunt capacitor 611 is coupled between the first node 613 and ground 614. In this embodiment, the first node 613 is coupled to the FRS module and the impedance matching circuit 604 is used for impedance matching the combined antenna 602 in the FRS frequency band.

The second impedance matching circuit 606 includes a second series inductor 616, a first series capacitor 618, a first shunt capacitor 620, a third series inductor 622, and a second shunt capacitor 624. The second series inductor 616 is coupled between the first RF feed 611 and a second node 615. The first series capacitor 618 is coupled between the second node 615 and a third node 617. A first shunt capacitor 620 is coupled between the third node 617 and the ground 614. The third series inductor 622 is coupled between the third node 617 and a fourth node 619, the fourth node 619 being coupled to a second RF circuit (e.g., WAN module 242). The second shunt capacitor 624 is coupled between the fourth node 619 and the ground 614. In this embodiment, the fourth node 619 is coupled to the WAN module and the impedance matching circuit 606 is used for impedance matching the combined antenna 602 in the LB WAN frequency band.

The third impedance matching circuit 608 includes a second series capacitor 626, a second shunt inductor 628, a third series capacitor 630, a third shunt inductor 632, and a fourth series capacitor 634. The second series capacitor 626 is coupled between the first RF feed 611 and a fifth node 621. The second shunt inductor 628 is coupled between the fifth node 621 and the ground 614. The third series capacitor 630 is coupled between the fifth node 621 and a sixth node 623. The third shunt inductor 632 is coupled between the sixth node 623 and the ground 614. The fourth series capacitor 634 is coupled between the sixth node 623 and a seventh node 625, the seventh node 625 being coupled to the second RF circuit (e.g., WAN module 242). In this embodiment, the seventh node 625 is coupled to the WAN module and the impedance matching circuit 608 is used for impedance matching the combined antenna 602 in the MB WAN frequency band. Alternatively, additional impedance matching networks may be coupled to the combined antenna 602. Also, other configurations of impedance matching network may be used for other frequency bands, such as HB WAN frequency band, WLAN frequency bands, PAN frequency bands, GPS frequency bands, or the like.

In another embodiment, the second impedance matching network 606 includes an antenna tuner 630. The antenna tuner 630 can be programmed such that a good match is achieved for a narrow bandwidth. The tuner 'state' can be changed depending on the band, channel and wireless technology in use so that the combined antenna 602 is well matched for that condition. The antenna tuner 630 may include a series capacitance that can be coupled in parallel to the series capacitor 618 to change the capacitance value. The antenna tuner 630 has a switch to act as a bypass to this series capacitor when not desired. The antenna tuner 630 may also include another switch to switch a shunt capacitor in parallel to the shunt capacitors 624 when desired. Alternatively, the antenna tuner 630 can be configured in other ways to provide flexibility to the capacitance or inductance values of the second impedance matching network 604. In other embodiments, antenna tuners can be used in the other impedance matching network 602 and 608.

Figure 7:
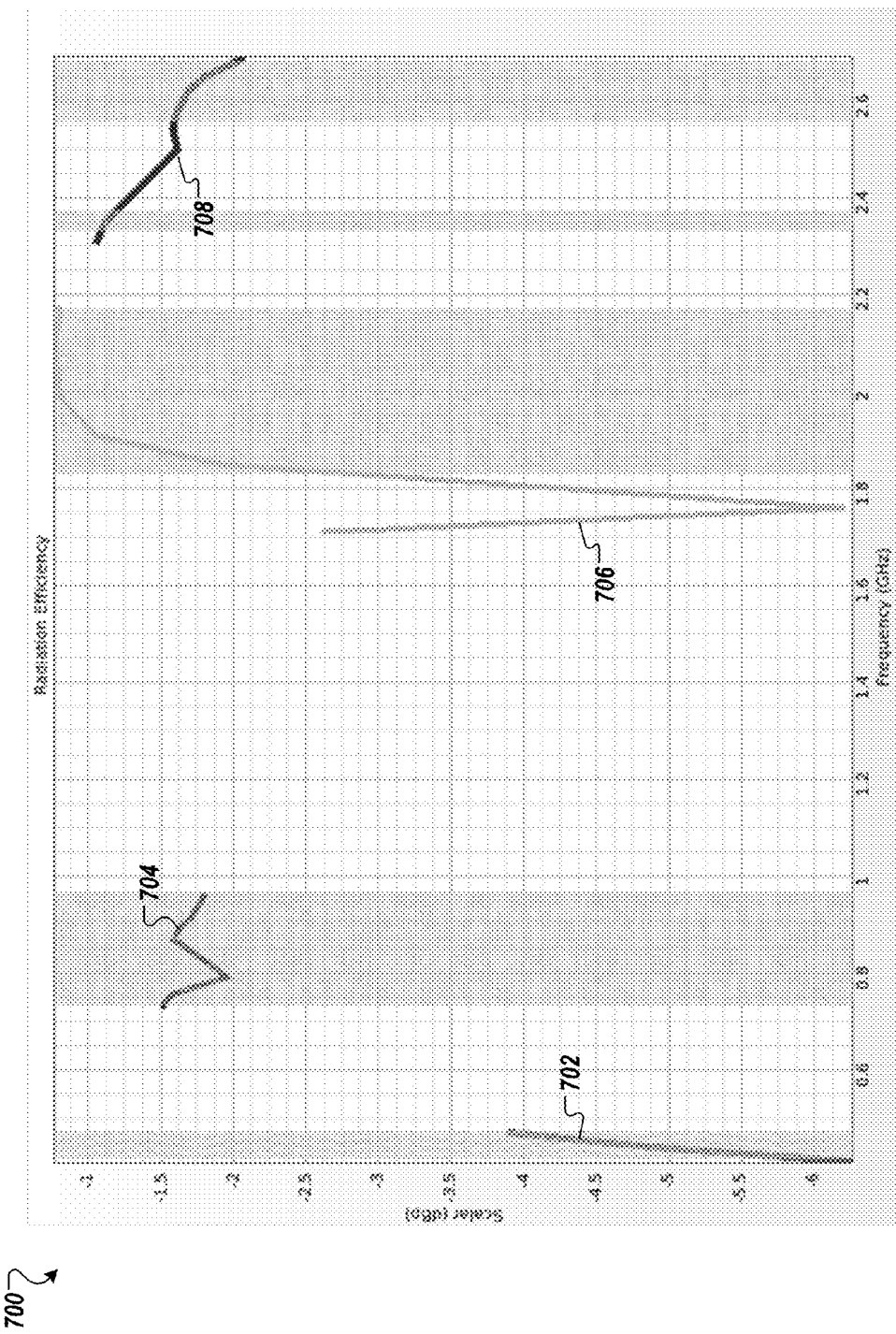
FIG. 7 is a graph of measured efficiency of the combined FRS-WAN antenna of FIG. 2 according to one embodiment.

FIG. 7 is a graph 700 of measured efficiency 701 of the combined FRS-WAN antenna 201 of FIG. 2 according to one embodiment. The graph 700 illustrates efficiency 702 over a first frequency range (e.g., 400 MHz to 500 MHz), efficiency 704 over a second frequency range (e.g., 700 MHz to 1000 MHz), efficiency 706 over a third frequency range (e.g., 1700 MHz to 2200 MHz), and efficiency 708 over a fourth frequency range (e.g., 2300 MHz to 2700 MHz). The graph 700 illustrates that the combine FRS-WAN antenna 201 is a viable antenna for the various frequency ranges in the FRS frequency band, and LB, MB, and HB WAN frequency bands. The efficiency of the combined FRS-WAN antenna 201 can be tuned for specified target bands. The efficiency of the combined FRS-WAN antenna 201 may be modified by adjusting dimensions of the 3D structure, the gaps between the elements of the antenna structure, or any combination thereof. Similarly, 2D structures can be modified in dimensions and gaps between elements to improve the efficiency in certain frequency bands.

Figure 8:
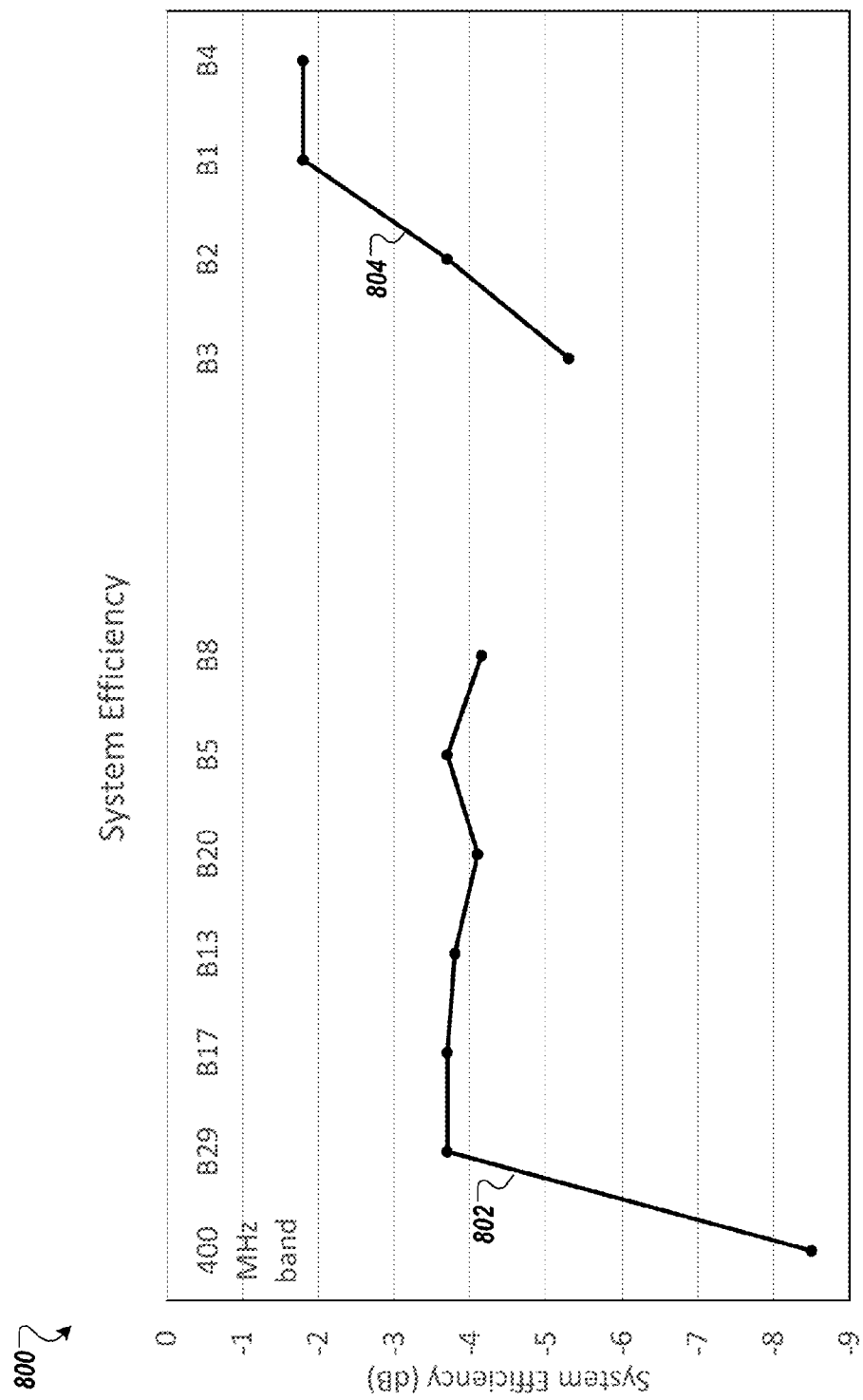
FIG. 8 is a graph of system efficiency of the user device of FIG. 1 according to one embodiment.

FIG. 8 is a graph 800 of system efficiency of the user device of FIG. 1 according to one embodiment. The graph 800 illustrates efficiency 802 over a first frequency range (e.g., 400 MHz to 960 MHz) (LB) and efficiency 804 over a second frequency range (e.g., 1700 MHz to 2200 MHz) (MB). The first frequency range covers FRS bands, B29, B17, B13, B20, B5, and B8 and the second frequency ranges covers bands B3, B2, B1, and B4. The total efficiency of the user device can be measured by including the loss of the structure (e.g., due to mismatch loss), dielectric loss, and radiation loss. The graph 700 illustrates that the combined FRS-WAN antenna 201 is a viable antenna for relevant frequency ranges.

Figure 9:
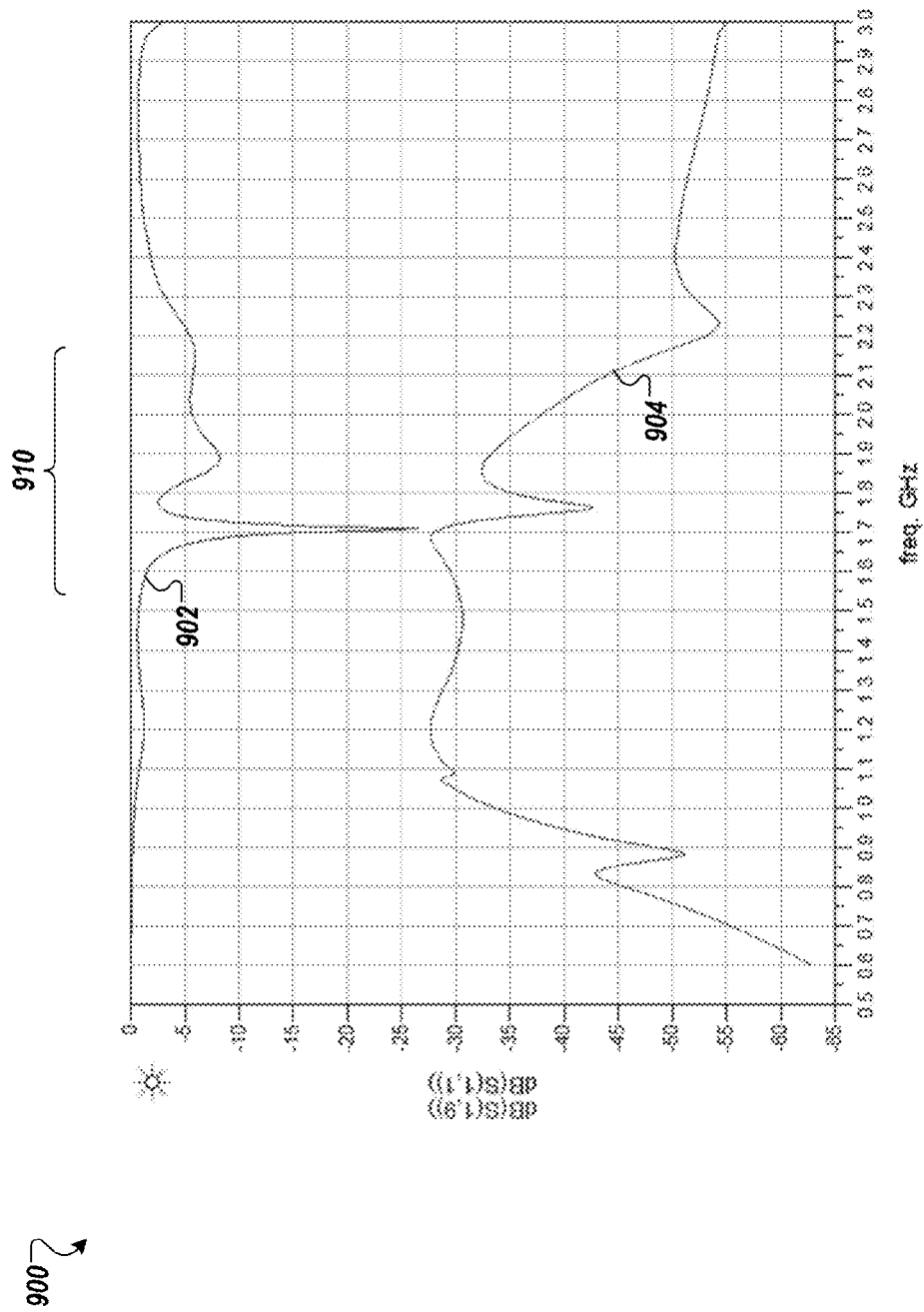
FIG. 9 is a graph with return loss and isolation of the combined FRS-WAN antenna of FIG. 2 in a mid-band according to one embodiment.

FIG. 9 is a graph 900 with return loss and isolation of the combined FRS-WAN antenna of FIG. 2 in a mid-band according to one embodiment. The graph 900 shows the return loss 902 and isolation 904 of the combined FRS-WAN antenna 201. The graph 900 illustrates that the combined FRS-WAN antenna 201 can be caused to radiate or receive electromagnetic energy between approximately 1700 MHz to approximately 2300 MHz in a mid-band (MB) 910.

Figure 10:
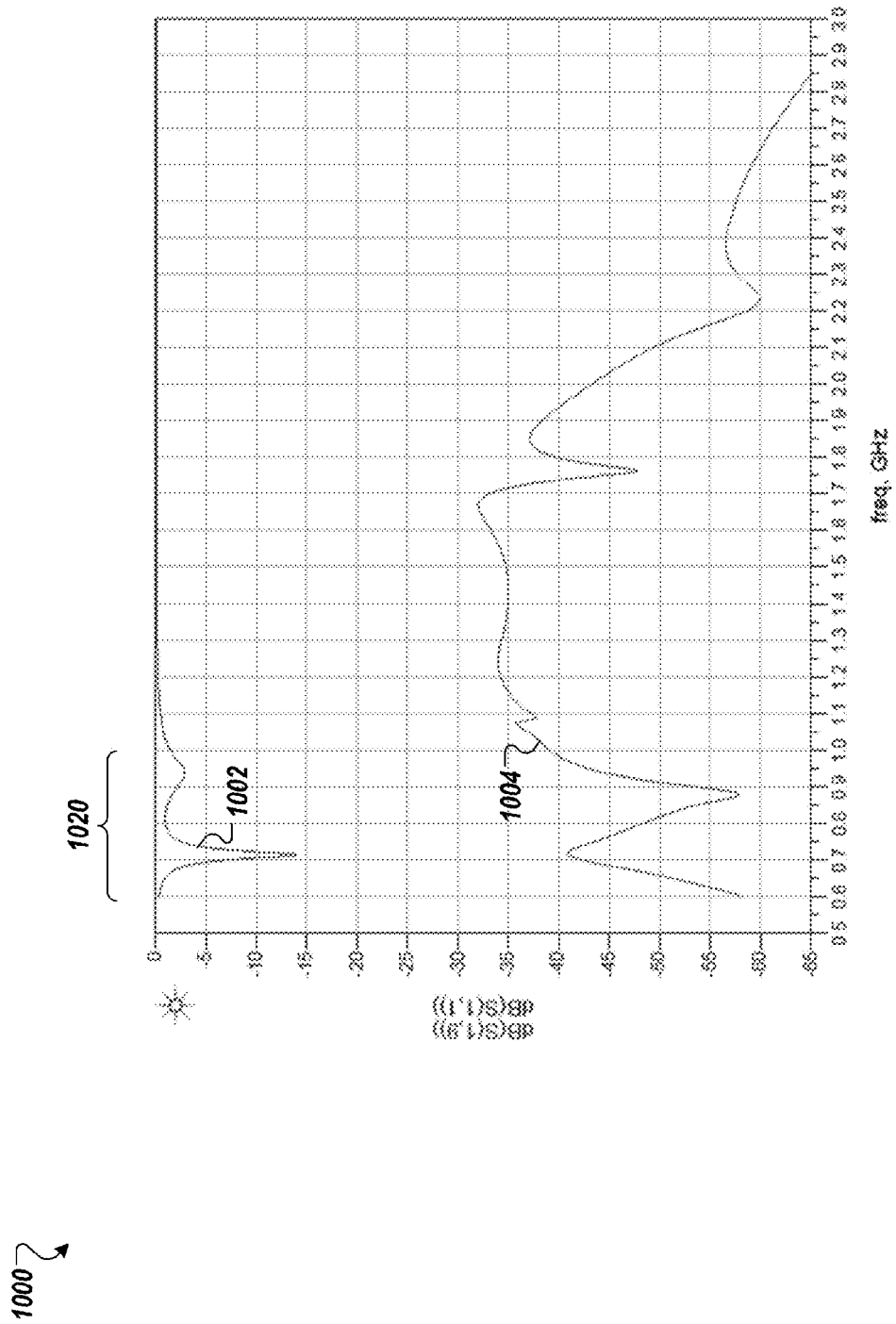
FIG. 10 is a graph with return loss and isolation of the combined FRS-WAN antenna of FIG. 2 in a low-band according to one embodiment.

FIG. 10 is a graph 1000 with return loss and isolation of the combined FRS-WAN antenna of FIG. 2 in a low-band according to one embodiment. The graph 1000 shows the return loss 1002 and isolation 1004 of the combined FRS-WAN antenna 201. The graph 1000 illustrates that the combined FRS-WAN antenna 201 can be caused to radiate or receive electromagnetic energy between approximately 650 MHz to approximately 1000 MHz in a low-band (LB) 1020.

Figure 11:
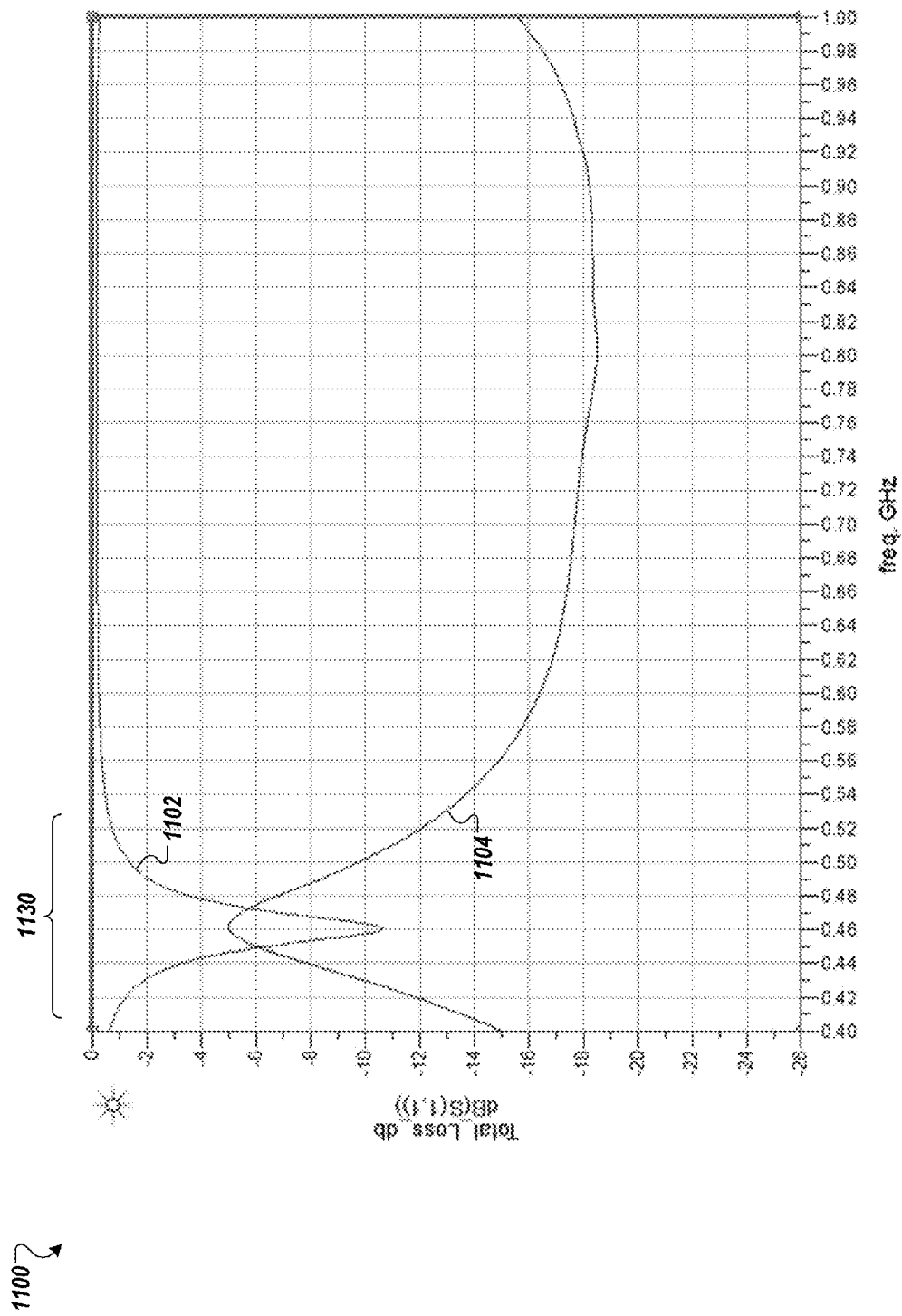
FIG. 11 is a graph with return loss and isolation of the combined FRS-WAN antenna of FIG. 2 in the FRS spectrum according to one embodiment.

FIG. 11 is a graph 1100 with return loss and isolation of the combined FRS-WAN antenna of FIG. 2 in the FRS spectrum according to one embodiment. The graph 1100 shows the return loss 1102 and isolation 1104 of the combined FRS-WAN antenna 201. The graph 1100 illustrates that the combined FRS-WAN antenna 201 can be caused to radiate or receive electromagnetic energy between approximately 400 MHz to approximately 500 MHz in the FRS spectrum 1130.

The combined FRS-WAN antenna 201 provides at least three resonant modes, including one in the mid-band MB 910, centered between approximately 1700~2170 MHz, one in the low-band LB 1020, centered between approximately 690~960 MHz, and one in the FRS spectrum 1130, centered between approximately 410~470 MHz. As described herein, the combined FRS-WAN antenna 201 can operate between approximately 1.7 GHz and approximately 2.7 GHz. As described herein, other resonant modes may be achieved and the resonant modes may cover different frequency ranges and may be centered at different frequencies than those described and illustrated herein.

Figure 12:
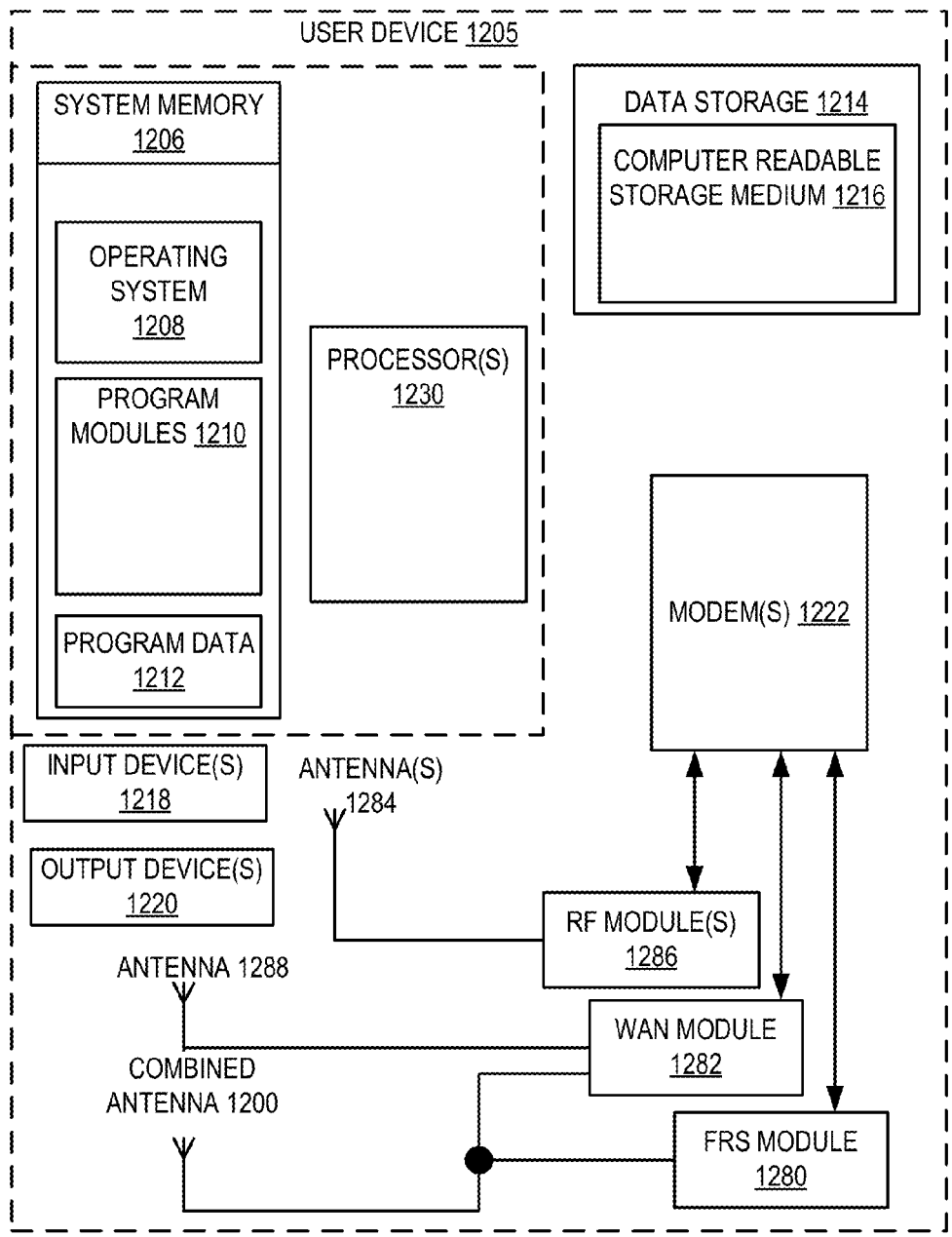
FIG. 12 is a block diagram of a user device in which embodiments of a combined FRS-WAN antenna may be implemented.

FIG. 12 is a block diagram of a user device 1205 in which embodiments of a combined FRS-WAN antenna 1200 may be implemented. The user device 1205 may correspond to the user device 100 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 1205 may be any portable or stationary user device. For example, the user device 1205 may be an intelligent voice control and speaker system. Alternatively, the user device 1205 can be any other device used in a WLAN network (e.g., Wi-Fi® network), a WAN network, or the like.

The user device 1205 includes one or more processor(s) 1230, such as one or more CPUs, microcontrollers, field programmable gate arrays, or other types of processors. The user device 1205 also includes system memory 1206, which may correspond to any combination of volatile and/or non-volatile storage mechanisms. The system memory 1206 stores information that provides operating system component 1208, various program modules 1210, program data 1212, and/or other components. The user device 1205 performs functions by using the processor(s) 1230 to execute instructions provided by the system memory 1206.

The user device 1205 also includes a data storage device 1214 that may be composed of one or more types of removable storage and/or one or more types of non-removable storage. The data storage device 1214 includes a computer-readable storage medium 1216 on which is stored one or more sets of instructions embodying any of the methodologies or functions described herein. Instructions for the program modules 1210 may reside, completely or at least partially, within the computer-readable storage medium 1216, system memory 1206 and/or within the processor(s) 1230 during execution thereof by the user device 1205, the system memory 1206 and the processor(s) 1230 also constituting computer-readable media. The user device 1205 may also include one or more input devices 1218 (keyboard, mouse device, specialized selection keys, etc.) and one or more output devices 1220 (displays, printers, audio output mechanisms, etc.).

The user device 1205 further includes a modem 1222 to allow the user device 1205 to communicate via a wireless network (e.g., such as provided by the wireless communication system) with other computing devices, such as remote computers, an item providing system, and so forth. The modem 1222 can be connected to a FRS module 1280, WAN module 1282, and zero or more RF modules 1286. The FRS module 1280 may be the FRS module 230 and the WAN module may be WAN modules 242, 342, as described herein. The FRS module 128 is coupled to the combined antenna 1200, which may be any one of the combined antennas described herein, such as the combined FRS-WAN antenna 201, 301, as well as the fifth antenna 110. The combined antenna 1200 is also connected to the WAN module 1282 for sequential, concurrent and simultaneous communications by the WAN module 1282 with communications by the FRS module 1280. The WAN module 1282 is also connected to a second antenna 1288. Zero or more antennas 1284 can be coupled to one or more RF modules 1286, which is also connected to the modem 1222. The modem 1222 allows the user device 1205 to handle both voice and non-voice communications (such as communications for text messages, multimedia messages, media downloads, web browsing, etc.) with the wireless communication system 1310 (or 1312) of FIG. 13. The modem 1222 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1222 may generate signals and send these signals to antenna 1200, 1288, and 1284 via FRS module 1280, WAN module 1282, and RF module(s) 1286 as descried herein. User device 1205 may additionally include a WLAN module, a GPS receiver, a PAN transceiver and/or other RF modules. These RF modules may additionally or alternatively be connected to one or more of antennas 1284, 1284, 1288. Antennas 1284, 1284, 1288 may be configured to transmit in different frequency bands and/or using different wireless communication protocols. The antennas 1284, 1284, 1288 may be directional, omnidirectional, or non-directional antennas. In addition to sending data, antennas 1284, 1284,

1288 may also receive data, which is sent to appropriate RF modules connected to the antennas.

In one embodiment, the user device 1205 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 1222 is shown to control transmission and reception via antenna structures (1200, 1284, 1288), the user device 1205 may alternatively include multiple modems, each of which is configured to transmit/receive data via a different antenna and/or wireless transmission protocol.

The user device 1205 delivers and/or receives items, upgrades, and/or other information via the network. For example, the user device 1205 may download or receive items from an item providing system. The item providing system receives various requests, instructions and other data from the user device 1205 via the network. The item providing system may include one or more machines (e.g., one or more server computer systems, routers, gateways, etc.) that have processing and storage capabilities to provide the above functionality. Communication between the item providing system and the user device 1205 may be enabled via any communication infrastructure. One example of such an infrastructure includes a combination of a wide area network (WAN) and wireless infrastructure, which allows a user to use the user device 1205 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 1205.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1205 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1205 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
a printed circuit board comprising radio frequency (RF) circuitry;
an inverted-L antenna coupled to the RF circuitry, wherein the RF circuitry is operable to cause the inverted-L antenna to radiate or receive electromagnetic energy in a first frequency band, a second frequency band, and a third frequency band, wherein the first frequency band is between approximately 410 MHz and 470 MHz, and wherein the second frequency band and the third frequency band are wireless area network (WAN) frequency bands;
a first impedance matching network coupled to the inverted-L antenna and a first RF feed of the RF circuitry, wherein the first impedance matching network matches an impedance of the inverted-L antenna to a first impedance of the RF circuitry to radiate or receive the electromagnetic energy in the first frequency band;
a second impedance matching network coupled to the inverted-L antenna and a second RF feed of the RF circuitry, wherein the second impedance matching network matches the impedance of the inverted-L antenna to a second impedance of the RF circuitry to radiate or receive the electromagnetic energy in the second frequency band; and
a third impedance matching network coupled to the inverted-L antenna and a third RF feed of the RF circuitry, wherein the third impedance matching network matches the impedance of the inverted-L antenna to a third impedance of the RF circuitry to radiate or receive the electromagnetic energy in the third frequency band.

2. The electronic device of claim 1, wherein the RF circuitry comprises:
a family radio service (FRS) module coupled to the first RF feed; and
a wireless area network (WAN) module coupled to the second RF feed and the third RF feed.

3. The electronic device of claim 1, wherein the RF circuitry is operable to cause the inverted-L antenna to radiate or receive electromagnetic energy in a fourth frequency band, wherein the fourth frequency band is a WAN frequency band between approximately 2400 MHz to approximately 2690 MHz, and the third frequency band is between approximately 1700 MHz and approximately 2170 MHz, wherein the electronic device further comprises:
a fourth impedance matching network coupled to the inverted-L antenna and a fourth RF feed of the RF circuitry, wherein the fourth impedance matching network matches the impedance of the inverted-L antenna to a fourth impedance of the RF circuitry to radiate or receive the electromagnetic energy in the fourth frequency band.

4. The electronic device of claim 1, further comprising:
a second antenna coupled to the RF circuitry; wherein the RF circuitry is operable to cause the inverted-L antenna to radiate or receive electromagnetic energy in a fourth frequency band, wherein the fourth frequency band is a WAN frequency band between approximately 2300 MHz to approximately 2690 MHz, and the third frequency band is between approximately 1700 MHz and approximately 2170 MHz; and
a fourth impedance matching network coupled to the second antenna and a fourth RF feed of the RF circuitry, wherein the fourth impedance matching network matches an impedance of the second antenna to a fourth impedance of the RF circuitry to radiate or receive the electromagnetic energy in the fourth frequency band, wherein the RF circuitry comprises:
a family radio service (FRS) module coupled to the first RF feed; and
a wireless area network (WAN) module coupled to the second RF feed, the third RF feed, and the fourth RF feed.

5. The electronic device of claim 4, wherein the RF circuitry is operable to cause the inverted-L antenna to radiate or receive electromagnetic energy in a fifth frequency band, wherein the fifth frequency band is a WAN frequency band between approximately 2400 MHz to approximately 2690 MHz and the fourth frequency band is between approximately 2300 MHz and approximately 2355 MHz, wherein the electronic device further comprises:
a fifth impedance matching network coupled to the inverted-L antenna and a fifth RF feed of the RF circuitry, wherein the fifth impedance matching network matches the impedance of the inverted-L antenna to a fifth impedance of the RF circuitry to radiate or receive the electromagnetic energy in the fifth frequency band, wherein
the wireless area network (WAN) module is coupled to the fifth RF feed.

6. An apparatus comprising:
an antenna element;
a first impedance matching circuit coupled to the antenna element at a feeding point;
a first radio frequency (RF) module coupled to the first impedance matching circuit;
a second impedance matching circuit coupled to the antenna element at the feeding point;
a third impedance matching circuit coupled to the antenna element at the feeding point; and
a second RF module coupled to the second impedance matching circuit and the third impedance matching circuit,
wherein the first RF module is operable to cause the antenna element to radiate or receive electromagnetic energy in a first frequency range and the first impedance matching circuit is operable to match an impedance of the antenna element to a first impedance of the first RF module to radiate or receive the electromagnetic energy in the first frequency range, wherein the second RF module is operable to cause the antenna element to radiate or receive electromagnetic energy in a second frequency range and a third frequency range, the second impedance matching circuit being operable to match the impedance of the antenna element to a second impedance of the second RF module to radiate the electromagnetic energy in the second frequency range and the second impedance matching circuit being operable to match the impedance of the antenna element to a third impedance of the second RF module to radiate the electromagnetic energy in the third frequency range, wherein first frequency band is between approximately 410 MHz and 470 MHz, and wherein the second RF module is operable to cause the antenna element to radiate or receive electromagnetic energy between approximately 690 MHz and approximately 2690 MHz.

7. The apparatus of claim 6, wherein the first RF module is a family radio service (FRS) module and the first frequency range is a FRS frequency band, wherein the second RF module is a wireless are network (WAN) module and the second frequency range is a first WAN frequency band and the third frequency range is a second WAN frequency band, and wherein the first WAN frequency band is lower than the second WAN frequency band.

8. The apparatus of claim 7, further comprising:
a second antenna element; and
a fourth impedance matching circuit coupled to the second antenna element at a second feeding point, wherein the WAN module is operable to cause the second antenna element to radiate or receive electromagnetic energy in a fourth frequency range and the fourth impedance matching circuit is operable to match an impedance of the second antenna element to a fourth impedance of the WAN module to radiate or receive the electromagnetic energy in the fourth frequency range, and wherein the fourth frequency range is a third WAN frequency band.

9. The apparatus of claim 8, wherein the FRS frequency band is between 410 MHz and 470 MHz, wherein the first WAN frequency band is between 690 MHz and 960 MHz, wherein the second WAN frequency band is between 1700 MHz and 2170 MHz, and wherein the third WAN frequency band is between 2300 MHz and 2690 MHz.

10. The apparatus of claim 6, further comprising a fourth impedance matching circuit coupled to the antenna element at the feeding point and coupled to the WAN module, wherein the WAN module is operable to cause the antenna element to radiate or receive electromagnetic energy in a fourth frequency range and the fourth impedance matching circuit is operable to match the impedance of the antenna element to a fourth impedance of the WAN module to radiate or receive the electromagnetic energy in the fourth frequency range, and wherein the fourth frequency range is a third WAN frequency band that is higher than the second WAN frequency band.

11. The apparatus of claim 10, further comprising:
a second antenna element; and
a fifth impedance matching circuit coupled to the second antenna element at a second feeding point, wherein the WAN module is operable to cause the second antenna element to radiate or receive electromagnetic energy in a fifth frequency range and the fifth impedance matching circuit is operable to match an impedance of the second antenna element to a fifth impedance of the WAN module to radiate or receive the electromagnetic energy in the fifth frequency range, and wherein the fifth frequency range is a fourth WAN frequency band that is higher than the second WAN frequency band, but lower than the third WAN frequency band.

12. The apparatus of claim 11, wherein the FRS frequency band is between 410 MHz and 470 MHz, wherein the first WAN frequency band is between 690 MHz and 960 MHz, wherein the second WAN frequency band is between 1700 MHz and 2170 MHz, wherein the third WAN frequency band is between 2400 MHz and 2690 MHz, and wherein the fourth WAN frequency band is between 2300 MHz and 2690 MHz.

13. The apparatus of claim 6, further comprising a modem coupled to the second RF module, and wherein the second RF module comprises:
first RF front-end circuitry coupled to the second impedance matching circuit; and
second RF front-end circuitry coupled to the third impedance matching circuit.

14. A user device comprising:
a first radio frequency (RF) feed;
a second RF feed;
a first antenna structure coupled to the first RF feed, wherein the first antenna structure is sized for family radio service (FRS) spectrum; and
a second antenna structure coupled to the second RF feed, wherein the second antenna structure is sized for a first wireless area network (WAN) frequency band;
a first RF circuit coupled to the first RF feed, wherein the first RF circuit is operable to cause the first antenna structure to radiate or receive electromagnetic energy in the FRS spectrum; and
a second RF circuit coupled to the second RF feed, wherein the second RF circuit is operable to cause the first antenna structure to receive electromagnetic energy in a second WAN frequency band or a third WAN frequency band concurrently with the first RF circuit receiving in the FRS spectrum, and wherein the second RF circuit is operable to cause the second antenna structure to receive electromagnetic energy in the first WAN frequency band, wherein the first WAN frequency band is higher than the second WAN frequency band and the third WAN frequency band.

15. The user device of claim 14, further comprising:
a first impedance matching circuit coupled between the first RF feed and the first RF circuit, the first impedance matching circuit is operable to match an impedance of the first antenna structure to a first impedance of the first RF circuit to radiate or receive the electromagnetic energy in the FRS spectrum;
a second impedance matching circuit coupled between the first RF feed and the second RF circuit;
a third impedance matching circuit coupled between the first RF feed and the second RF circuit; and
a fourth impedance matching circuit coupled between the second RF feed and the second RF circuit.

16. The user device of claim 15, wherein:
the first impedance matching circuit comprises:
a first series inductor coupled between the first RF feed and a first node, the first node being coupled to the first RF circuit;
a first shunt inductor coupled between the first node and ground; and
a shunt capacitor coupled between the first node and the ground;

the second impedance matching circuit comprises:
- a second series inductor coupled between the first RF feed and a second node;
- a first series capacitor coupled between the second node and a third node;
- a first shunt capacitor coupled between the third node and the ground;
- a third series inductor coupled between the third node and a fourth node, the fourth node being coupled to the second RF circuit; and
- a second shunt capacitor coupled between the fourth node and the ground; and the third impedance matching circuit comprises:
- a second series capacitor coupled between the first RF feed and a fifth node;
- a second shunt inductor coupled between the fifth node and the ground;
- a third series capacitor coupled between the fifth node and a sixth node;
- a third shunt inductor coupled between the sixth node and the ground; and
- a fourth series capacitor coupled between the sixth node and a seventh node.

17. The user device of claim 15, further comprising a modem coupled to the second RF circuit, wherein the second RF circuit is a WAN module comprising:
- a first RF front-end circuit coupled to the second impedance matching circuit, wherein the first RF front-end circuit is operable to cause the first antenna structure to radiate or receive electromagnetic energy in the second WAN frequency band, wherein the second impedance matching circuit is operable to match the impedance of the first antenna structure to a second impedance of the first RF front-end circuit to radiate or receive the electromagnetic energy in the second WAN frequency band;
- a second RF front-end circuit coupled to the third impedance matching circuit, wherein the second RF front-end circuit is operable to cause the first antenna structure to radiate or receive electromagnetic energy in the third WAN frequency band, wherein the third impedance matching circuit is operable to match the impedance of the first antenna structure to a third impedance of the second RF front-end circuit to radiate or receive the electromagnetic energy in the third WAN frequency band, wherein the third WAN frequency band is higher than the second WAN frequency band; and
- a third RF front-end circuit coupled to the fourth impedance matching circuit, wherein the third RF front-end circuit is operable to cause the second antenna structure to radiate or receive electromagnetic energy in the first WAN frequency band, wherein the fourth impedance matching circuit is operable to match an impedance of the second antenna structure to a fourth impedance of the third RF front-end circuit to radiate or receive the electromagnetic energy in the first WAN frequency band, wherein the first WAN frequency band is higher than the third WAN frequency band.

18. The user device of claim 17, wherein the FRS spectrum is between approximately 410 MHz and 470 MHz, wherein the second WAN frequency band is between approximately 690 MHz and 960 MHz, wherein the third WAN frequency band is between approximately 1700 MHz and 2170 MHz, and wherein the first WAN frequency band is between approximately 2300 MHz and 2690 MHz.

19. The user device of claim 15, further comprising:
- a fifth impedance matching circuit coupled between the first RF feed and the second RF circuit; and
- a modem coupled to the second RF circuit, wherein the second RF circuit is a WAN module comprising:
  - a first RF front-end circuit coupled to the second impedance matching circuit, wherein the first RF front-end circuit is operable to cause the first antenna structure to radiate or receive electromagnetic energy in the second WAN frequency band, wherein the second impedance matching circuit is operable to match the impedance of the first antenna structure to a second impedance of the first RF front-end circuit to radiate or receive the electromagnetic energy in the second WAN frequency band;
  - a second RF front-end circuit coupled to the third impedance matching circuit, wherein the second RF front-end circuit is operable to cause the first antenna structure to radiate or receive electromagnetic energy in the third WAN frequency band, wherein the third impedance matching circuit is operable to match the impedance of the first antenna structure to a third impedance of the second RF front-end circuit to radiate or receive the electromagnetic energy in the third WAN frequency band, wherein the third WAN frequency band is higher than the second WAN frequency band;
  - a third RF front-end circuit coupled to the fifth impedance matching circuit, wherein the third RF front-end circuit is operable to cause the first antenna structure to radiate or receive electromagnetic energy in a fourth WAN frequency band, wherein the fifth impedance matching circuit is operable to match the impedance of the first antenna structure to a fourth impedance of the third RF front-end circuit to radiate or receive the electromagnetic energy in the fourth WAN frequency band, wherein the fourth WAN frequency band is higher than the third WAN frequency band; and
  - a fourth RF front-end circuit coupled to the fourth impedance matching circuit, wherein the fourth RF front-end circuit is operable to cause the second antenna structure to radiate or receive electromagnetic energy in the first WAN frequency band, wherein the fourth impedance matching circuit is operable to match an impedance of the second antenna structure to a fifth impedance of the fourth RF front-end circuit to radiate or receive the electromagnetic energy in the first WAN frequency band, wherein the first WAN frequency band is higher than the third WAN frequency band, but lower than the fourth WAN frequency band.

20. The user device of claim 19, wherein the FRS spectrum is between approximately 410 MHz and 470 MHz, wherein the second WAN frequency band is between approximately 690 MHz and 960 MHz, wherein the third WAN frequency band is between approximately 1700 MHz and 2170 MHz, wherein the fourth WAN frequency band is between approximately 2400 MHz and 2690 MHz, and wherein the first WAN frequency band is between approximately 2300 MHz and 2355 MHz.

* * * * *